(12) United States Patent
Souza

(10) Patent No.: US 11,766,768 B2
(45) Date of Patent: Sep. 26, 2023

(54) SPARE TIRE TOOL KIT

(71) Applicant: Anthony Souza, Chesapeake, VA (US)

(72) Inventor: Anthony Souza, Chesapeake, VA (US)

(*) Notice: Subject to any disclaimer, the term of this patent is extended or adjusted under 35 U.S.C. 154(b) by 0 days.

(21) Appl. No.: 17/509,253

(22) Filed: Oct. 25, 2021

(65) Prior Publication Data

US 2023/0013849 A1 Jan. 19, 2023

Related U.S. Application Data

(60) Provisional application No. 63/223,203, filed on Jul. 19, 2021.

(51) Int. Cl.
*B25B 21/00* (2006.01)
*B60S 5/00* (2006.01)

(52) U.S. Cl.
CPC .............. *B25B 21/002* (2013.01); *B60S 5/00* (2013.01)

(58) Field of Classification Search
CPC .............. B25B 21/002; B25B 23/0007; B25B 23/0021; B25B 23/0035; B25B 23/0042; B25B 15/001; B60S 5/00; B60B 29/005; B60B 29/006; B62D 43/04; B62D 43/045
USPC ........................................................ 81/177.1
See application file for complete search history.

(56) References Cited

U.S. PATENT DOCUMENTS

| | | | | |
|---|---|---|---|---|
| 3,490,547 A * | 1/1970 | Stewart | ............. | B25F 3/00 173/217 |
| 7,465,144 B1 * | 12/2008 | Studer | ............. | B60P 1/5442 414/541 |
| 9,463,559 B1 * | 10/2016 | Chan | ............. | B25B 23/0021 |
| 9,718,505 B2 * | 8/2017 | Goss | ............. | B62D 43/002 |
| 2008/0179841 A1 * | 7/2008 | Chen | ............. | B25B 15/001 279/143 |
| 2011/0048175 A1 * | 3/2011 | LeVert | ............. | B25B 13/06 81/177.1 |
| 2011/0113563 A1 * | 5/2011 | Gabb | ............. | B60B 29/006 7/100 |
| 2014/0069237 A1 * | 3/2014 | Vigil | ............. | B25B 23/0021 81/124.4 |
| 2020/0338701 A1 * | 10/2020 | Hack | ............. | B25B 13/06 |
| 2022/0314695 A1 * | 10/2022 | Everline | ............. | B60B 29/005 |

OTHER PUBLICATIONS

Thegipper, I'm missing my tool to lower my spare tire.—Toyota 4Runner Forum—Largest 4Runner Forum, Jun. 20, 2018, https://www.toyota-4runner.org/3rd-gen-t4rs/258702-im-missing-my-tool-lower-my-spare-tire.html, entry #5 on p. 3/8. (Year: 2018).*

* cited by examiner

*Primary Examiner* — David B. Thomas
(74) *Attorney, Agent, or Firm* — Brennan, Manna & Diamond, LLC

(57) ABSTRACT

The present invention relates to a vehicle's spare tire tool used for lowering down a spare tire stowed underneath of a vehicle, such as pick-up truck, SUV or any other off-road vehicle. The tool can also be used for stowing the tire back to the bottom of the vehicle. The tool kit features a 13" tubular rod, that is designed to fit into a cordless drill, using an integrated male connector for rotating the rod. The rod also accommodates a connecting tip for hooking into a winch system of the vehicle. The rod with the attached connecting tip is inserted into an access hole at the rear of the vehicle and is rotated by the cordless drill. The tool kit enables users of all ages to easily dismount spares without overexertion or strain.

6 Claims, 5 Drawing Sheets

SPARE TIRE TOOL KIT

CROSS-REFERENCE TO RELATED APPLICATION

The present application claims priority to, and the benefit of, U.S. Provisional Application No. 63/223,203, which was filed on Jul. 19, 2021 and is incorporated herein by reference in its entirety.

FIELD OF THE INVENTION

The present invention relates generally to the field of a spare tire handling device for a vehicle. More specifically, the present invention relates to a spare tire tool that is used for lowering down a spare tire from underneath a vehicle. The tool can also be used for stowing the tire back to the bottom of the vehicle. More specifically, the tool kit has a tubular rod that is designed to fit to a cordless drill using an integrated male connector. The tool kit enables users of all ages to easily dismount spares without overexertion or strain. Accordingly, the present disclosure makes specific reference thereto. Nonetheless, it is to be appreciated that aspects of the present invention are also equally applicable to other like applications, devices and methods of manufacture.

BACKGROUND

By way of background, tire blowouts/bursts are common. In a blowout, a rapid loss of inflation pressure of an inflatable tire takes place. The primary reason for a tire blowout is an object cutting or tearing through the tire, such that the tire is incapable of containing the compressed air. The escaping air adds to further tear through the tire structure. Other reasons for a tire blowout, can be one or more of, too little air pressure, extreme heat, impact damage, overloading or a combination thereof. When a tire blowout takes place, the vehicle starts limping instantly and the blown-out tire drags the vehicle. The vehicle cannot accelerate when a blowout takes place. Occurrences of tire blow-outs happen frequently for people who frequently go camping in rougher terrain and whose off-road vehicles often navigate rocky, jagged roads. On such rocky and jagged roads, blow-outs of a tire can take place when the tire hits a pothole or runs over a large object. Uneven tread can also contribute to the tire blow-out and even a minor puncture can cause a blowout sometimes.

When a tire blowout takes place, a user generally needs to dismount a spare tire and then replace the blown-out tire with the spare tire. Off-road vehicles, sport utility vehicles (SUV) and pick-up trucks and the like have a spare tire stowed beneath the rear end of the vehicle and attached to the vehicle frame members. These vehicles allow spare tires to be stored outside of the vehicle compartment, as they lack interior space in which to store a tire. Dismounting such a spare tire stowed in such a position, requires a person to put forth a great deal of effort from an awkward position under the vehicle, to lower and remove a tire therefrom.

Generally, a winch-type mechanism mounted to the undercarriage of the vehicle is used to lower the spare wheel from the bottom of the vehicle body where it is stored. The said winch mechanism uses a cable with a yoke as an attachment means. Typically, manual labor and effort are required from the user to rotate a bulky and long detachable hand crank to lower the spare tire using the winch-type mechanism, which can be difficult for women and elderly people. When operated, the winch is cranked, and the spare tire is lowered to the ground by the cable. Optionally, the flat tire being replaced may be put onto the retaining device and then raised into the stored position under the vehicle for transport, until it may be repaired or replaced. The entire process puts overexertion and/or strain on the user.

Therefore, there exists a long felt need in the art for a spare tire tool kit that allows easy access to spare tires stowed under truck beds, even with campers in tow. There is also a long felt need in the art for a spare tire tool kit that enables users of all ages to easily dismount spares without overexertion or strain. Additionally, there is a long felt need in the art for a spare tire tool kit that eliminates the manual labor of rotating a crank handle for lowering a spare tire. Moreover, there is a long felt need in the art for a spare tire tool kit that is portable, sturdy and easy to use. Furthermore, there is a long felt need in the art for a spare tire tool kit that can be customized for use with any vehicle. Finally, there is a long felt need in the art for a spare tire tool kit that eliminates manual lowering of the spare tire and allows dismount of spares without overexertion or strain.

The subject matter disclosed and claimed herein, in one embodiment thereof, comprises a tool kit for easily lowering under-mounted spare tires on vehicles. The tool kit resembles a jack handle and offers a viable alternative to using bulky 2×4" jack crank handles. The tool kit comprises a tubular rod, wherein the tubular rod has a first end with an integrated male connector and a second end having a tip connector. The male connector is designed to be secured to a chuck of a cordless drill and the tip connector is configured to receive a connecting tip. The connecting tip attaches to the tip connector of the rod and is designed to insert into an access hole at the rear of a vehicle, positioned between the tailgate and the bumper rod for engaging with a winch tube of the vehicle. A cordless drill then rotates the rod, allowing the connecting tip to lower down the stowed spare tire, without any manual rotation of the rod.

In this manner, the spare tire tool kit of the present invention accomplishes all of the forgoing objectives and provides a relatively smaller, safer, sturdier and more portable device that enables the lowering of a spare tire from underneath a vehicle using a cordless drill. The device is in the form of a sleek rod and occupies less space and can be customized for use with any vehicle, by attaching tips corresponding to the vehicle for lowering down and up the spare tire.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a tool kit for easily lowering under-mounted spare tires on vehicles. The tool kit is designed to resembles a jack handle and offers a viable alternative to using bulky 2×4" jack crank handles. The tool kit further comprises a tubular rod, wherein the tubular rod has a first end with an integrated male connector and a second end having a tip connector. The male connector is designed to be secured to a chuck of a cordless drill, and the tip connector is configured to receive a connecting tip. The connecting tip attaches to the tip connector of the rod and is designed to insert into an access hole at the rear of a vehicle, positioned between the tailgate and the bumper rod for engaging with a winch tube of the vehicle. The cordless drill rotates the rod, allowing the connecting tip to lower down the stowed spare tire without any manual rotation of the rod.

In yet another embodiment of the present invention, the rod works like a crank handle and the drill provides torque to rotate the rod and thus enables lowering of the stowed spare tire without manual rotation of the rod.

In yet another embodiment, a tool kit for lowering a spare tire of a pick-up truck is disclosed. The tool kit includes a 13" long solid tubular rod with a ½" diameter, a male connector integrated at one end of the rod and a hollow opposite end of the rod for receiving a connecting tip, and a ½" cordless drill having a chuck for securing the male connector, wherein the connecting tip attached to the hollow end is inserted in a vehicle's rear lowering mechanism port.

In yet another embodiment of the present invention, the connecting tip attached to the rod is engaged or hooked to a winch tube of the winch system of the vehicle, for lowering down the spare tire stowed underneath the vehicle. Further, the connecting tip is detachably-secured to the rod and can be replaced, allowing the tool kit to be used with any vehicle.

In yet another embodiment, the male connector is in the form of a drill bit that secures into the chuck of a cordless drill, easily allowing the cordless drill to rotate the rod in both clockwise and counterclockwise directions.

In yet another embodiment of the present invention, a method for lowering down a spare tire from underneath of a vehicle is disclosed. The method includes the steps of initially attaching a connecting tip to the rod, then securing the male connector of the rod to a chuck of the cordless drill. Thereafter, inserting the connecting tip attached to the rod into an access hole disposed at the rear of the vehicle. Further, hooking to the wrench tube of the vehicle and finally activating the cordless drill to rotate the rod to lower down the spare tire, by rotating the wrench tube connected to the connecting tip.

The device of the present invention is employed to easily and quickly lower down the spare tire from a stowed position and also stow a tire back underneath of the vehicle, without any manual rotation of a crank handle. The device enables users of all ages to easily dismount spares without overexertion or strain, and offers a viable alternative to using bulky 2×4" jack crank handles.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
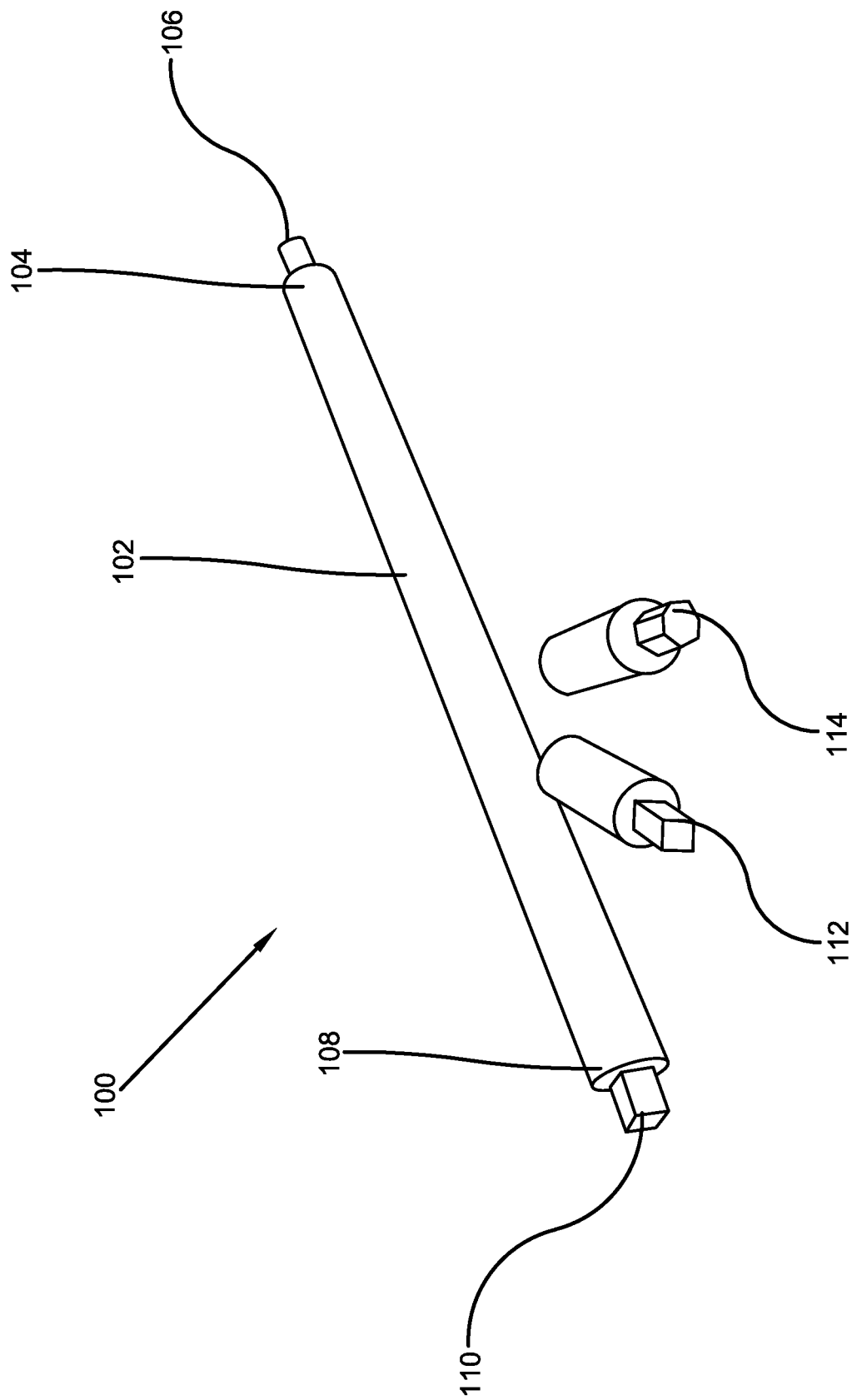
FIG. 1 illustrates a perspective view of one potential embodiment of the spare tire tool kit of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a spare tire tool kit that allows for easy access to spare tires stowed under truck beds, even with campers in tow. There is also a long felt need in the art for a spare tire tool kit that enables users of all ages to easily dismount spares without overexertion or strain. Additionally, there is a long felt need in the art for a spare tire tool kit that eliminates the manual labor of rotating a crank handle for lowering a spare tire. Moreover, there is a long felt need in the art for a spare tire tool kit that is portable, sturdy and easy to use. Furthermore, there is a long felt need in the art for a spare tire tool kit that can be customized for use with any vehicle. Finally, there is a long felt need in the art for a spare tire tool kit that eliminates the manual lowering of the spare tire and allows for the dismount of spares without overexertion or strain.

The present invention, in one exemplary embodiment, discloses a novel tool kit for lowering a spare tire of a pick-up truck. The tool kit includes a 13" long, solid tubular rod with a ½" diameter, a male connector integrated at one end of the rod and a hollow opposite end of the rod for receiving a connecting tip, and a ½" cordless drill having a chuck for securing the male connector, wherein the connecting tip attaches to the hollow end and is inserted in a vehicle's rear lowering mechanism port. The cordless drill rotates the tubular rod, which rotates the connecting tip to lower down the spare tire from underneath the vehicle.

Referring initially to the drawings, FIG. 1 illustrates a perspective view of one embodiment of the spare tire tool kit 100 of the present invention. The spare tire tool kit 100 is designed as a solid, black metal rod that resembles a jack handle, but can be manufactured of any other suitable material as is known in the art. The tool kit 100 allows for easy access to spare tires under truck beds, SUVs, etc., and even vehicles with campers in tow. More specifically, the tool kit 100 is a 13" long, tubular rod 102 having a ½" diameter, or any other suitable length and/or diameter measurement as is known in the art. The tubular rod 102 is rigid yet ergonomic and acts as a convenient and reliable tool for lowering down and lifting a spare wheel. The rod 102 weighs approximately two pounds, there making the tool kit 100 lightweight and portable.

A first end 104 of the rod 102 has a male connector 106 that is designed to easily fit into the chuck of a ½" cordless drill machine. The male connector 106 is designed to be compatible with any conventional ½" drill and allows a user to rotate the rod 102, using the cordless drill with the male connector 106 fitted into the chuck, in a manner like a drill bit. The second end 108 of the rod 102 has a tip connector 110, for receiving a tip that fits into a vehicle's rear lowering mechanism port and for connecting to the winch system of the vehicle, to lower down the spare tire. The tip connector 110 can receive a plurality of different types of connecting tips as is known in the art, such as the tip shown at 112, 114, which are customized for different vehicles, thus enabling users to use the tool kit 100 with a plurality of vehicles.

The rod 102, when attached to a tip at the tip connector 110, can be rotated using the cordless drill in a manner like manual rotation of the crank handle. Use of the drill eliminates the manual labor of rotating a manual crank handle to lower down a spare from underneath a vehicle. The rod 102, with the connecting tip inserted inside the vehicle, fits into a threaded rod of the winch system of the vehicle. Then, the rod 102 is rotated using the cordless drill to lower the spare tire to the ground.

The rod 102, when connected to a tip at the tip connector 110 is long enough, such that the bumper of the vehicle does not obstruct the operation of lowering the spare tire. The tool kit 100 can be used with RVs, trailers, and trucks, etc., and provides enough clearance to lower the additional spare tire. Further, additional mounting hardware and a manual crank handle and spanner is not required during use of the tool kit 100. In one variant of the present invention, a plurality of connecting tips can be commercially available with the rod 102 and alternatively, the connecting tips for cranking the spare down can be purchased separately by users. It should be appreciated that the tool kit 100 eliminates the use of conventional crank handles for accessing the spare and the compatibility of the male connector 106, with a cordless drill makes the process quick, efficient, and labor free.

Figure 2:
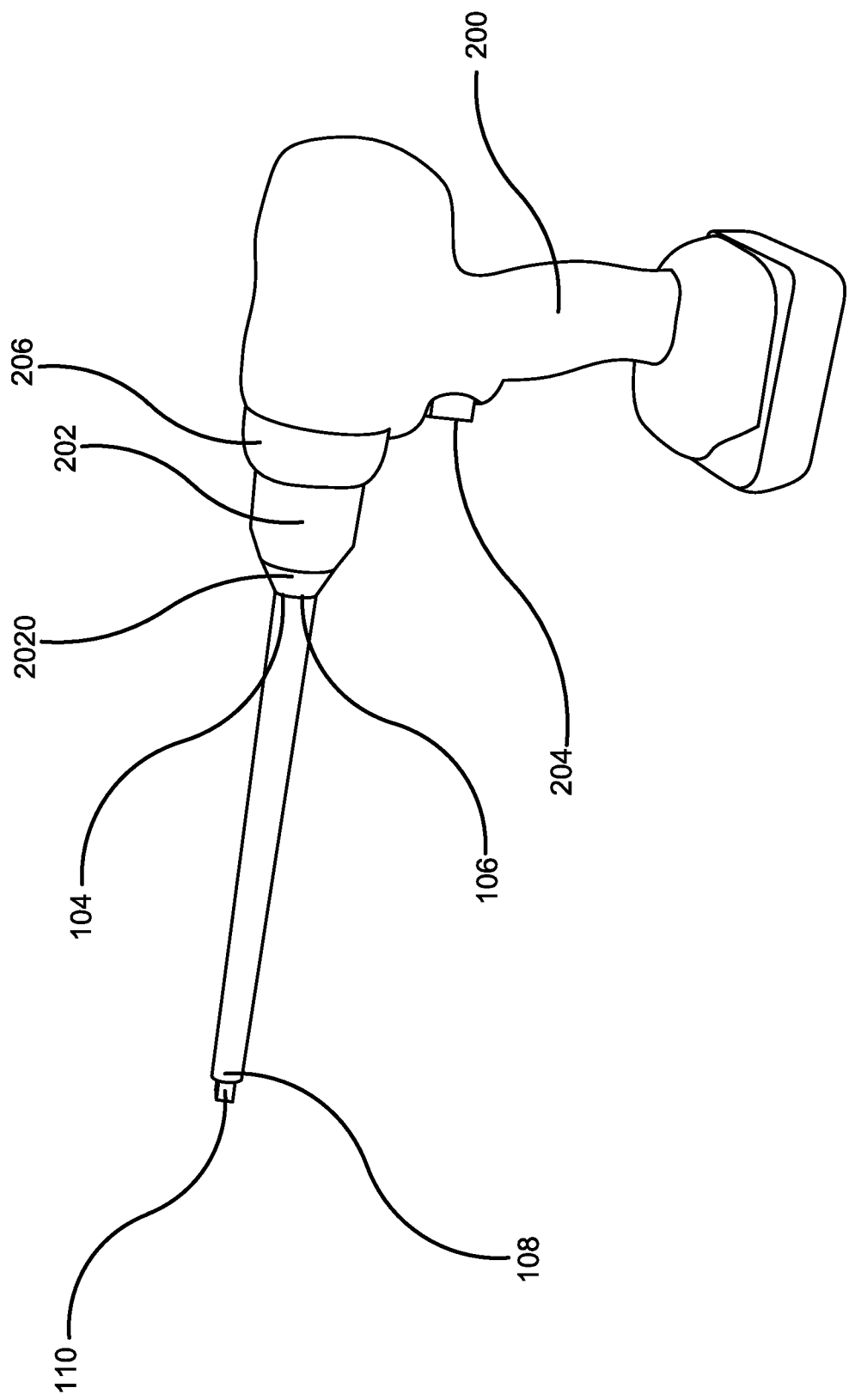
FIG. 2 illustrates a perspective view showing components of one potential embodiment of the spare tire tool kit of the present invention attached to a cordless drill in accordance with the disclosed architecture.

FIG. 2 illustrates a perspective view showing the tool kit 100 of the present invention attached to a ½" cordless drill. The male connector 106 at the first end 104 of the rod 102 is inserted into the chuck 202 of the cordless drill 200, which enables a user to rotate the rod 102. Specifically, the trigger 204 of the drill 200 can be used to automatically rotate the rod 102 at a desired rotating speed, such that a connecting tip attached to the tip connector 110 at the second end 108 can rotate a threaded rod of a winch system of the vehicle, to lower down or lift the spare tire. The male connector 106 securely fits into the chuck 202, by inserting the male connector 106 into the chuck jaw 2020 and then rotating the chuck 202 relative to the back portion 206 of the chuck 202. The male connector 106 is then locked into the chuck 202 and the torque applied to the rod 102 allows the winch system of the vehicle to easily dismount the spare tire.

When the tool kit 100 is not used, the male connector 106 can be detached from the chuck 202, allowing the rod 102 to be securely placed in the vehicle without occupying a lot of space. In one embodiment, the spare tire handle 100 along with the cordless drill 200 can be used with a jack to lift a vehicle. Any conventional jack, such as a scissor car jack, hydraulic jack, etc., or any other suitable jack as is known in the art, can be used with the tool kit 100 for lifting the vehicle to replace a blown-out tire.

Figure 3:
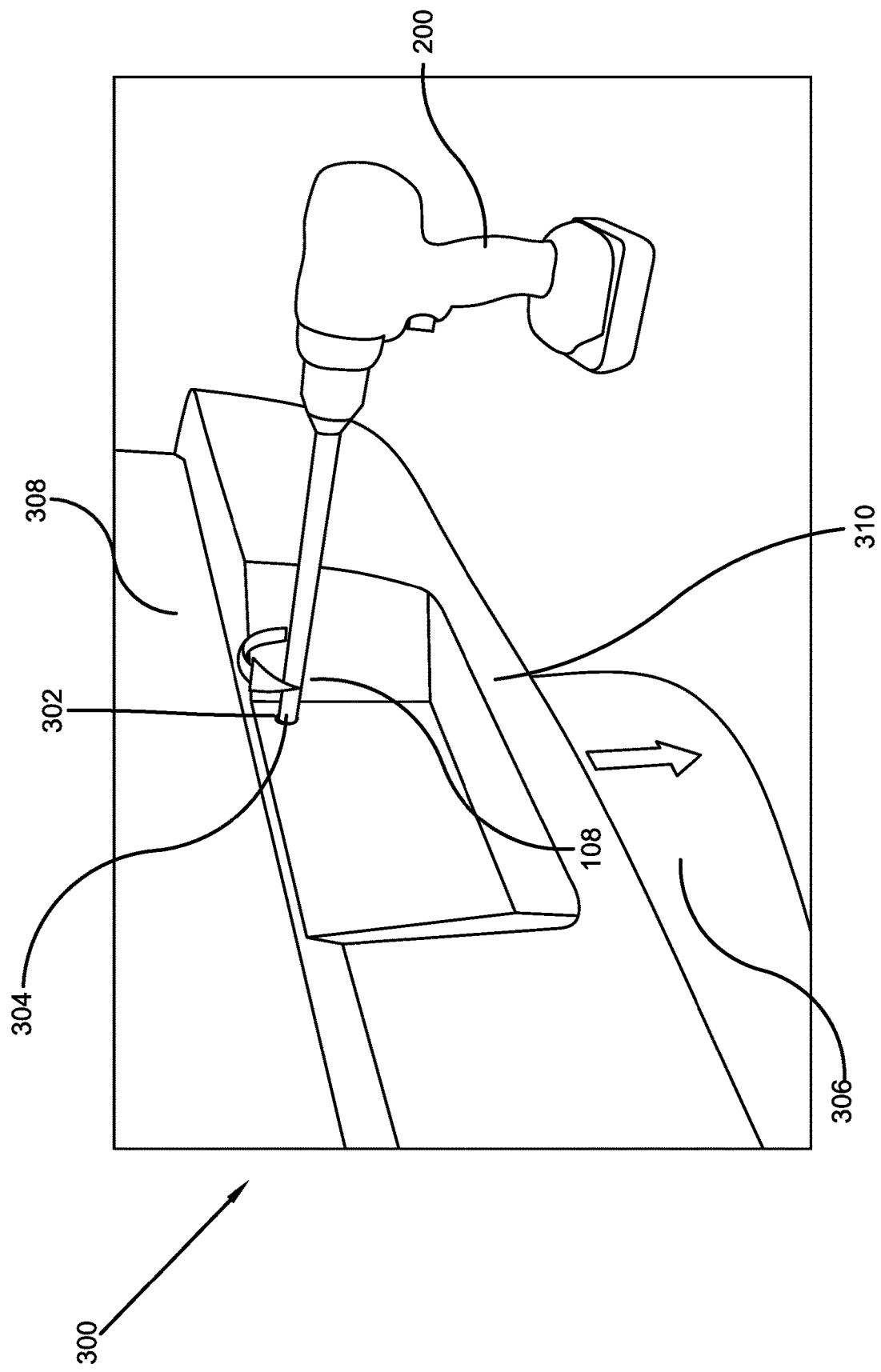
FIG. 3 illustrates a perspective view showing use of one potential embodiment of the spare tire tool kit of the present invention, along with a cordless drill to lower a vehicle's spare tire in accordance with the disclosed architecture.

FIG. 3 illustrates a perspective view showing use of the tool kit 100 of the present invention, along with a cordless drill 200 to lower a truck's spare tire. The male connector 106 of the spare tire dismounting device 100 is secured to the chuck 202 of the cordless drill 200 and the connecting tip 304 (can also be one of 112, 114 shown in FIG. 1) attached to the second end 108 is inserted into the rear lowering mechanism port 302 of the vehicle 300. The rear lowering mechanism port 302 is disposed between the rear tailgate 310 and the bumper 308. The connecting tip 304 is detachably-secured to the tip connector 110, such that depending on the type of the vehicle, the connecting tip 304 can be replaced with a compatible tip as needed. The connecting tip 304 is engaged with a winch mechanism tube (not shown) positioned inside the vehicle 300, that is configured for lowering down the spare tire 306. The drill 200 provides a torque that rotates the rod 102 and also the connecting tip 304 in a counter-clockwise direction (or clockwise direction, as per the design) enabling the connecting tip 304 to disengage the winch mechanism tube and dismount or lower down the spare tire 306. The 13" length of the rod 102 along with the length of the connecting tip 304 provides clearance from the bumper 308 of the vehicle 300 for a simple and automatic operation of lowering down the spare tire 306. The rod 102 being automatically rotated by the drill 200 replaces the manual operation of rotating a conventional bulky 2×4" jack crank handles and thus can be used by women and elderly people.

In one embodiment, the male connector 106 can be integrated and molded to the rod 102 and alternatively, the male connector 106 can be detachably-secured to the rod 102, allowing a user to replace the male connector 106 in case the male connector 106 wears down or becomes damaged. The spare tire handle 100 can be used for lowering down spares and lifting heavy vehicles and eliminates the requirement of carrying bulky and long manual crank handles that need to be assembled, along with a wrench unit.

Figure 4:
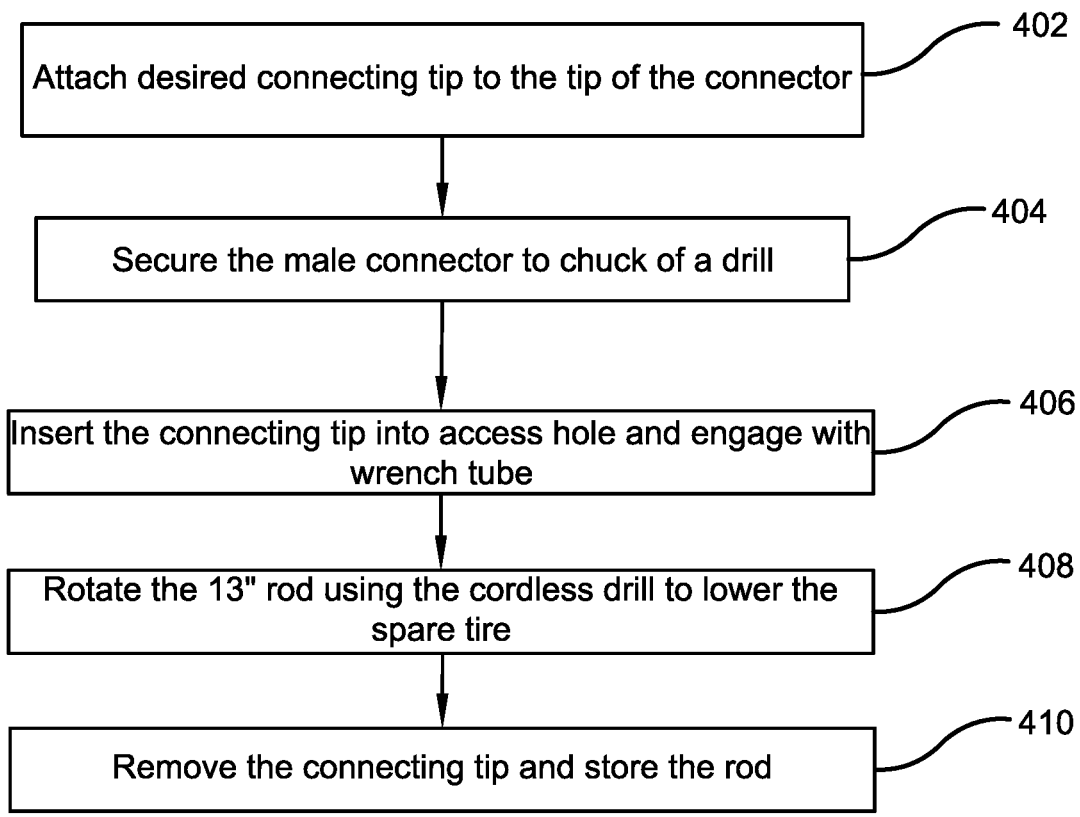
FIG. 4 illustrates a flow diagram showing the exemplary steps performed for lowering a spare tire from a stowed position underneath a vehicle using one potential embodiment of the spare tire tool kit of the present invention in accordance with the disclosed architecture.

FIG. 4 illustrates a flow diagram showing the exemplary steps performed for lowering down the spare tire from a stowed position underneath a vehicle using the tool kit 100 of the present invention. It should be understood that the present embodiment states the basic flow performed by a user and additional actions may be used to add additional processes to the basic flow. Initially, based on the type and design of the vehicle, at 402 a connecting tip to engage with the wrench tube inside the vehicle is attached to the tip connector of the tool kit device. Then at 404, the male connector at the opposite end of the rod is secured to a chuck of the cordless drill. Thereafter, at 406 the connecting tip attached to the rod is inserted into the access hole disposed at the rear of the vehicle, and is engaged with the wrench tube of the vehicle. For lowering down the spare tire, at 408 the cordless drill is activated using the trigger and the rod is rotated to lower down the spare tire via rotating the wrench tube connected to the connecting tip. Finally at 410, the connecting tip is removed from the rod and both the rod and the connecting tip are stored in the vehicle.

Figure 5:
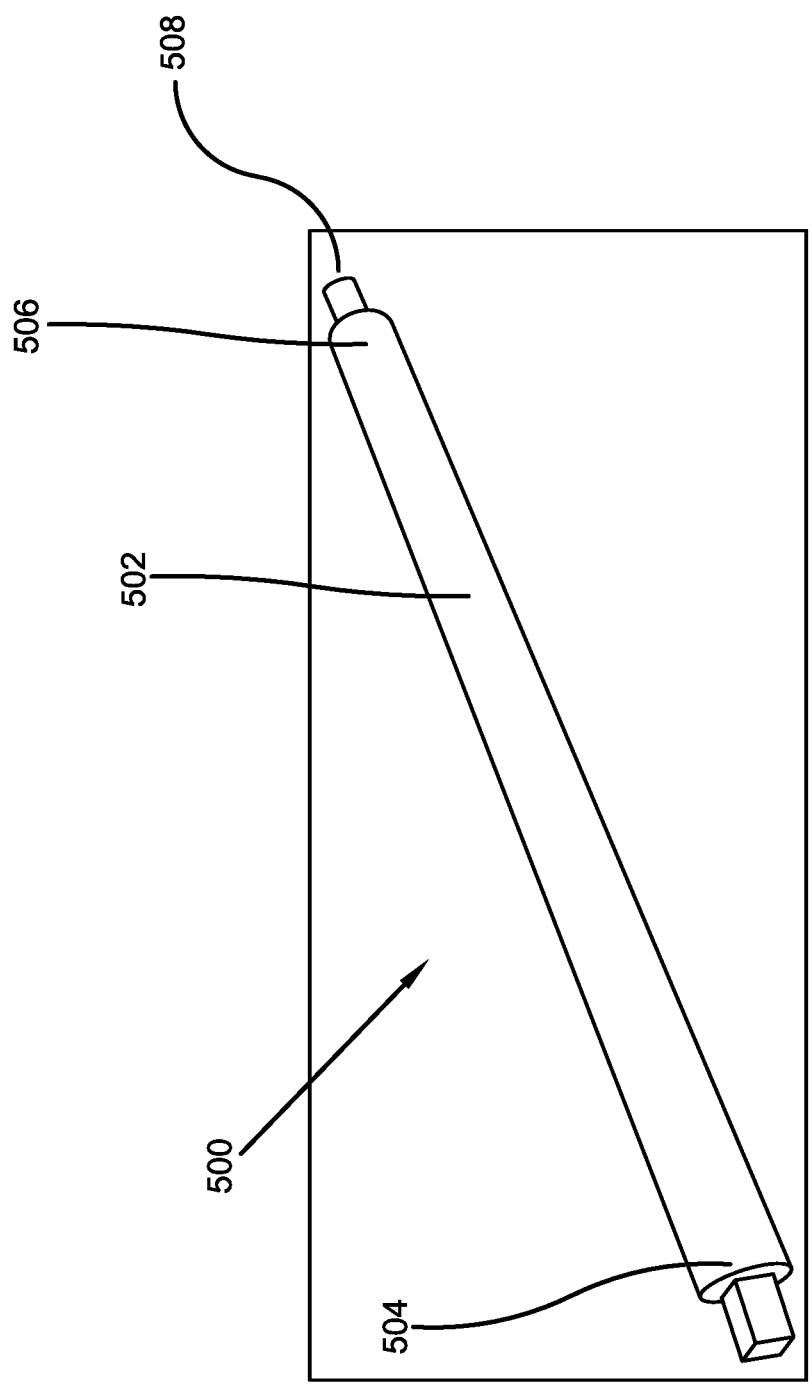
FIG. 5 illustrates a perspective view of another potential embodiment of the spare tire tool kit of the present invention in accordance with the disclosed architecture.

FIG. 5 illustrates a perspective view of another embodiment of the spare tire tool kit of the present invention. The tool kit 500 of the present embodiment has a rod 502 comprising a hollow end 504 for receiving a connecting tip. The connecting tip can be detachably-screwed to the hollow end 504, or alternatively can be integrated as a single piece with the hollow end 504. The other end 506 comprises a male connector 508 for securing into the chuck of a cordless drill. The length of the rod 502 can range from approximately 13" to 16", and the diameter can range from approximately ½" to 1" to fit vehicles of various sizes and designs.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "spare tire tool kit", "tool kit", "spare tire handle", "spare tire dismounting device", "kit", and "device" are interchangeable and refer to the spare tire tool kit 100 of the present invention.

Notwithstanding the forgoing, the spare tire tool kit 100 of the present invention can be of any suitable size and configuration as is known in the art without affecting the overall concept of the invention, provided that it accomplishes the above-stated objectives. One of ordinary skill in the art will appreciate that the size, configuration and material of the spare tire tool kit 100 as shown in FIGS. 1-5 is for illustrative purposes only, and that many other sizes and shapes of the spare tire tool kit 100 are well within the scope of the present disclosure. Although the dimensions of the spare tire tool kit 100 are important design parameters for user convenience, the spare tire tool kit 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A spare tire tool kit for lowering a spare tire from under a vehicle without manual rotation of a crank handle, the spare tire tool kit comprising:
   a cordless drill;
   a tubular rod comprising a first end and a second end;
   a male connector detachably secured to the first end and configured to fit into a chuck of the cordless drill for rotating the tubular rod;
   a female opening within the second end and configured for receiving a tip that fits into a vehicle's rear lowering mechanism port, wherein the vehicle's rear lowering mechanism port connects to a winch system of the vehicle to lower the spare tire from a stowed position via rotation of the tubular rod; and
   a plurality of different sized tips detachably screwable into the female opening within the second end.

2. The spare tire tool kit of claim 1, wherein a trigger of the cordless drill is used to automatically rotate the tubular rod at a desired rotating speed.

3. The spare tire tool kit of claim 2, wherein the tip attached to the tip connector rotates a threaded rod of the winch system to lower the spare tire.

4. The spare tire tool kit of claim 3, wherein the male connector securely fits into the chuck by inserting the male connector into a chuck jaw and then rotating the chuck relative to a back portion of the chuck, thereby locking the male connector into the chuck.

5. The spare tire tool kit of claim 4, wherein when the spare tire tool kit is not in use, the male connector can be detached from the chuck, thereby allowing the tubular rod to be stored in the vehicle.

6. The spare tire tool kit of claim 1, wherein the female opening within the second end is configured to receive each of the plurality of different sized tips.

* * * * *